(12) United States Patent
Lee

(10) Patent No.: US 10,514,464 B2
(45) Date of Patent: Dec. 24, 2019

(54) PORTABLE PRISM RECEIVER AND IMPROVED PORTABLE GPS RECEIVER AND MEASUREMENT METHOD USING SAME

(71) Applicants: THE-CONS ENG CO., LTD., Uiwang-si (KR); Duk Goo Lee, Suwon-si (KR)

(72) Inventor: Duk Goo Lee, Suwon-si (KR)

(73) Assignees: THE-CONS ENG CO., LTD., Uiwang-si (KR); Duk Goo Lee, Suwon-si (KR)

(*) Notice: Subject to any disclaimer, the term of this patent is extended or adjusted under 35 U.S.C. 154(b) by 167 days.

(21) Appl. No.: 15/552,101

(22) PCT Filed: Feb. 24, 2016

(86) PCT No.: PCT/KR2016/001787
§ 371 (c)(1),
(2) Date: Aug. 18, 2017

(87) PCT Pub. No.: WO2016/140458
PCT Pub. Date: Sep. 9, 2016

(65) Prior Publication Data
US 2018/0031710 A1    Feb. 1, 2018

(30) Foreign Application Priority Data
Mar. 3, 2015 (KR) .......... 10-2015-0029911

(51) Int. Cl.
*G01C 5/06* (2006.01)
*G01S 19/14* (2010.01)
(Continued)

(52) U.S. Cl.
CPC ............... *G01S 19/14* (2013.01); *G01C 1/02* (2013.01); *G01C 5/00* (2013.01); *G01C 15/00* (2013.01);
(Continued)

(58) Field of Classification Search
CPC .......... G01S 19/14; G01C 15/16; G01C 15/08
(Continued)

(56) References Cited

U.S. PATENT DOCUMENTS 2,245,901 A * 6/1941 Chaskin ................ G01C 15/06
248/178.1
2,575,245 A * 11/1951 Carlson ................ G01C 15/10
33/295
(Continued)

FOREIGN PATENT DOCUMENTS

JP 06186320 7/1994
JP 06232615 8/1994
(Continued)

OTHER PUBLICATIONS

International Search Report—PCT/KR2016/001787 dated May 3, 2016.

*Primary Examiner* — Christopher W Fulton
(74) *Attorney, Agent, or Firm* — Cantor Colburn LLP

(57) ABSTRACT

Provided is an improved portable prism receiver and an improved portable GPS receiver and a measurement method using the same to rapidly measure accurate locations in building construction and civil construction sites. The receiver has a simple structure and volume, thereby enabling convenient transportation and storage, and enables an unskilled worker to conduct mechanically accurate measurements in a construction site, thereby improving quality and economic efficiency.

13 Claims, 21 Drawing Sheets

(51) Int. Cl.
*G01C 15/08* (2006.01)
*G01C 15/06* (2006.01)
*G01C 5/00* (2006.01)
*G01C 15/00* (2006.01)
*G01C 15/02* (2006.01)
*G01S 17/88* (2006.01)
*G01S 19/01* (2010.01)
*G01C 1/02* (2006.01)
*G01S 17/42* (2006.01)
*G01S 19/48* (2010.01)
*G01S 7/481* (2006.01)

(52) U.S. Cl.
CPC ............ *G01C 15/02* (2013.01); *G01C 15/06* (2013.01); *G01C 15/08* (2013.01); *G01S 7/481* (2013.01); *G01S 17/42* (2013.01); *G01S 17/88* (2013.01); *G01S 19/01* (2013.01); *G01S 19/48* (2013.01)

(58) Field of Classification Search
USPC .............................. 33/293, 296; 342/357.52

See application file for complete search history.

(56) References Cited

U.S. PATENT DOCUMENTS

| | | | | |
|---|---|---|---|---|
| 3,685,162 | A * | 8/1972 | Haun | G01C 15/06 33/295 |
| 4,339,880 | A * | 7/1982 | Hall | F16M 11/046 248/163.1 |
| 5,419,052 | A * | 5/1995 | Goller | G01C 15/00 33/293 |
| 5,614,918 | A * | 3/1997 | Dinardo | F16M 11/14 248/181.1 |
| 5,749,549 | A * | 5/1998 | Ashjaee | F16M 11/14 248/168 |
| 6,834,839 | B1 * | 12/2004 | Wilson | F16M 13/02 248/230.1 |
| 2011/0289788 | A1 * | 12/2011 | Steffensen | G01C 15/06 33/296 |
| 2013/0270405 | A1 * | 10/2013 | Hunter | G01C 15/06 248/125.8 |
| 2014/0360031 | A1 * | 12/2014 | Kahlow | G01C 15/06 33/228 |
| 2015/0268045 | A1 * | 9/2015 | Dusha | G01C 15/06 33/228 |
| 2017/0176185 | A1 * | 6/2017 | Maar | G01C 15/06 |

FOREIGN PATENT DOCUMENTS

| | | |
|---|---|---|
| JP | 09061510 | 3/1997 |
| JP | 3114923 | 12/2000 |
| JP | 5372897 | 12/2013 |

\* cited by examiner

FIG. 1
*Prior Art*
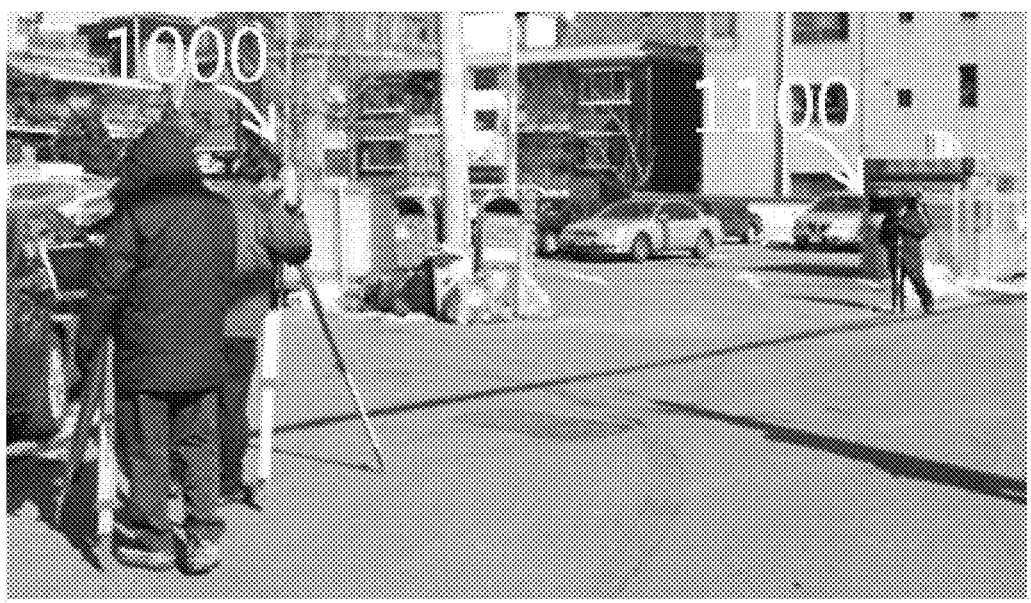
(a)
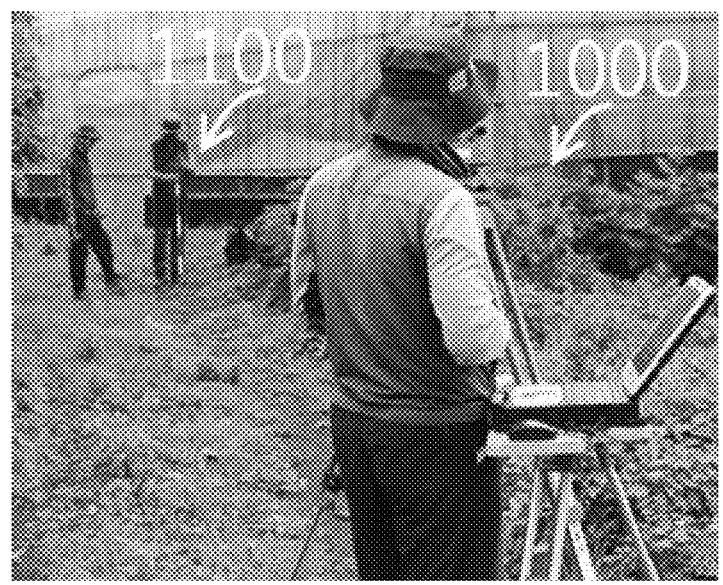
(b)

FIG. 2
*Prior Art*
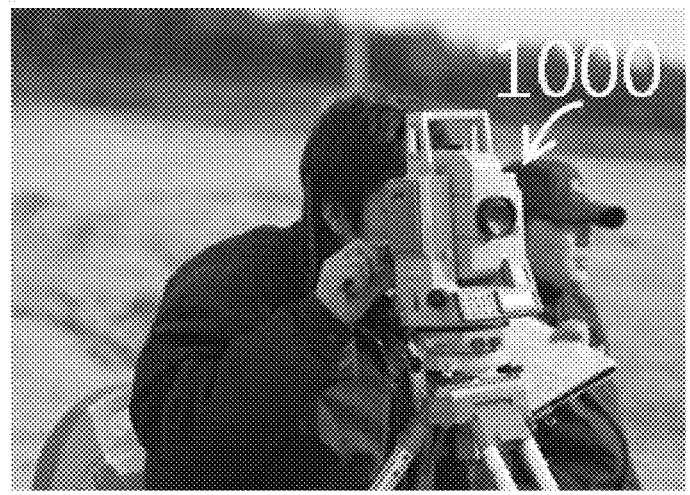
(a)
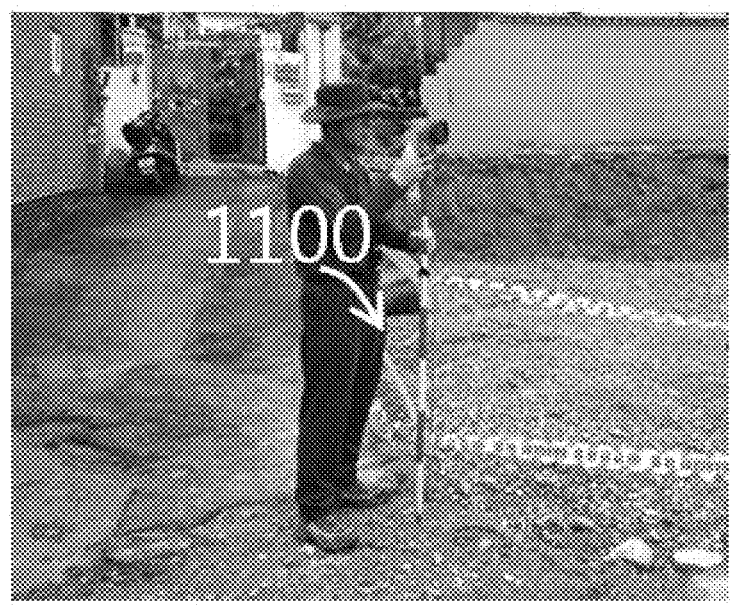
(b)

FIG. 3
*Prior Art*
(a)
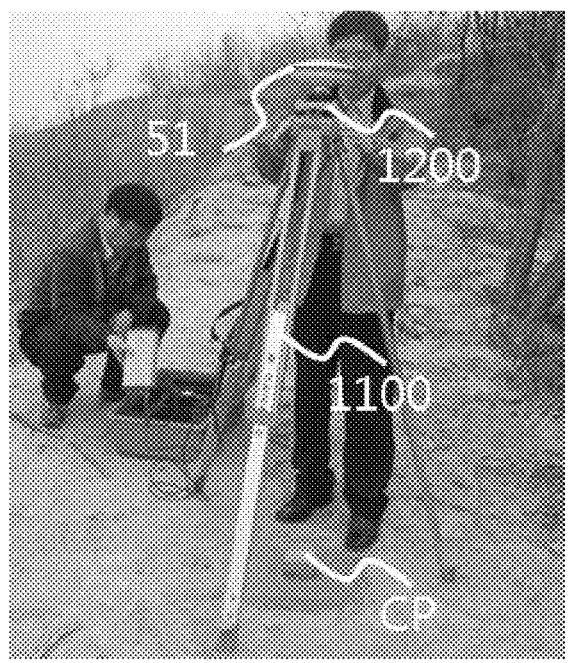
(b)
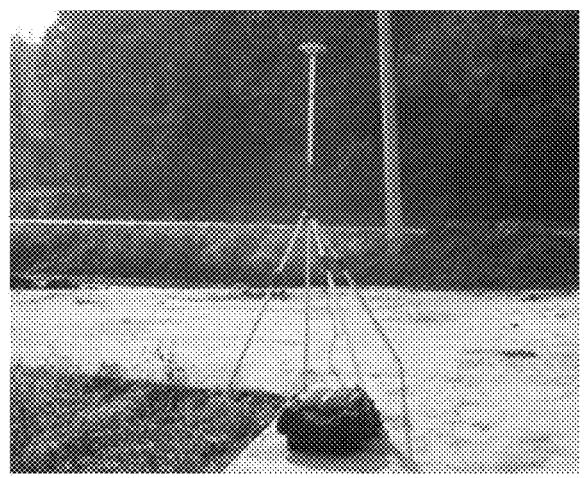
(c)

FIG. 15
P 1
P 2
P 3
P 4
P 5
P 6

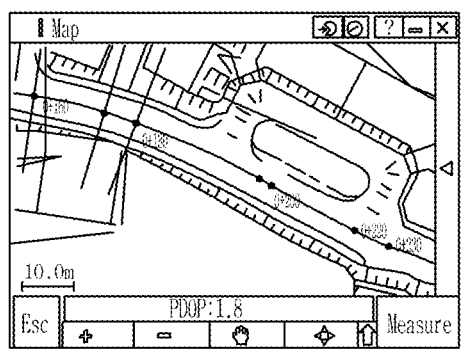

Next screen is a screen in which a DXF file and a road file are linked together.

It is possible to measure and set out the points on the drawing and also to measure arbitrary points.

(b)

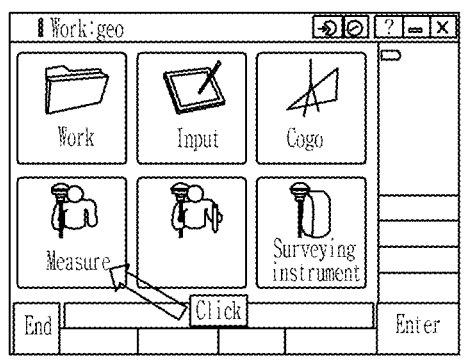

If a new file is made, now. measurement starts.

Please click measurement.

(c)

-observed result check like screen
* observed values except coordinates may be correctable
(point name, code, and target height)

FIG. 21
(a)
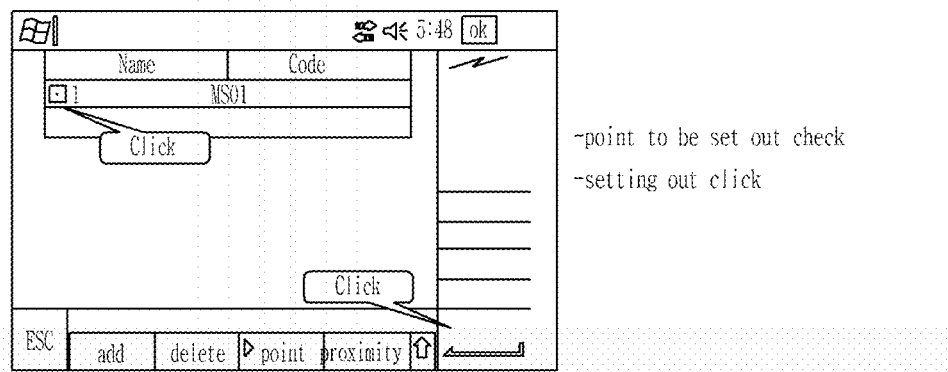
- point to be set out check
- setting out click
(b)
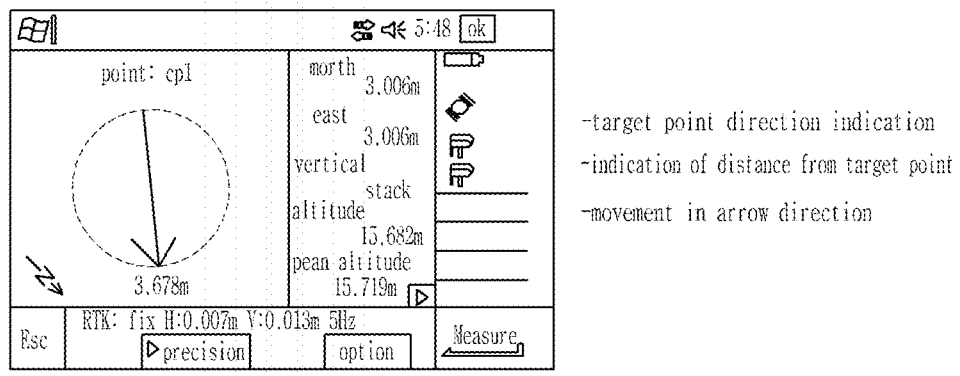
- target point direction indication
- indication of distance from target point
- movement in arrow direction
(c)
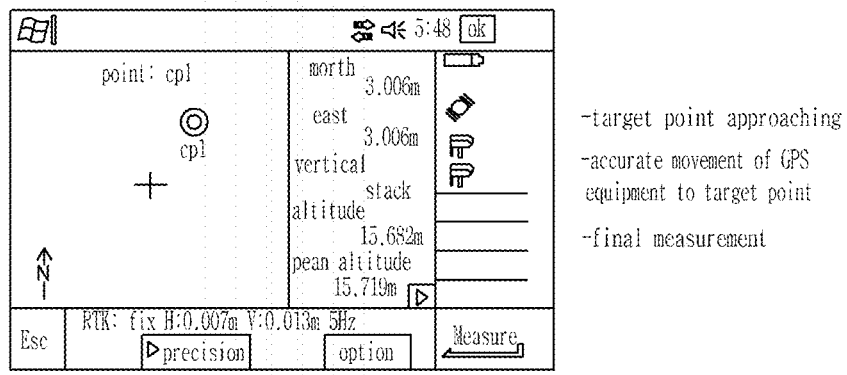
- target point approaching
- accurate movement of GPS equipment to target point
- final measurement

PORTABLE PRISM RECEIVER AND IMPROVED PORTABLE GPS RECEIVER AND MEASUREMENT METHOD USING SAME

TECHNICAL FIELD

The present invention relates to an improved portable prism receiver, an improved portable GPS receiver and a measurement method using the same that are adapted to rapidly measure accurate locations in building construction and civil construction sites, while being simple in structure and volume to enable convenient transportation and storage, and that allow even an unskilled worker to conduct mechanically accurate measurements in a construction site to improve the quality and economic efficiency thereof.

BACKGROUND ART

FIGS. 1 and 2 are photographs showing measurement methods using conventional theodolite and measuring pole, and FIG. 3 is photographs showing a measurement method using a conventional GPS measuring instrument.

Generally, the measurement in a civil construction site, is carried out by means of a theodolite 1000 and a GPS receiver 51, as will be discussed later.

1. Measurement Method Using Theodolite

A measurement method using a theodolite includes the steps of: (a) allowing a center point of the theodolite 1000 to correspond to a coordinate point (reference point, CP) of the ground as an instrument point at which the theodolite 1000 is installed; (b) leveling the theodolite 1000; (c) collimating back collimation to set an azimuth angle; (d) locating a measuring pile at an arbitrary point to obtain a new reference point CP; (e) locating a measuring pole 1100 to which a prism and a circular bubble (level) are coupled at a center point of the measuring pile to perform the leveling of the circular bubble by means of a tripod and tongs attached to the tripod; (f) obtaining the azimuth angle and a distance value through the theodolite 1000; and (g) obtaining the coordinate of the reference point CP through the azimuth angle and the distance value.

A method for setting out an observation point (a center line of a road, alignment of curbs, and center of manhole) includes the steps of: (a) locating a theodolite at an instrument point to set the azimuth angle of the observation point; (b) aligning the center of a measuring pole to the line collimated by the set azimuth angle; (c) performing leveling through a level; (d) obtaining a distance value using the theodolite; and (e) repeatedly adjusting the measuring pole forwardly and backwardly in a direction of the collimated line in accordance with the result of the distance value.

2. Measurement Method Using GPS Measuring Instrument

A measurement method using a GPS measuring instrument includes the steps of: (a) coupling a GPS receiver 51 to a measuring pole 1100; (b) locating a measuring pile at an arbitrary point to obtain a reference point CP; (c) installing the measuring pole 1100 to which the GPS receiver 51 is attached on a center point of the measuring pile; (d) leveling a circular bubble (level) attached to the measuring pole 1100 by means of a tripod and tongs attached to the tripod; and (e) obtaining the coordinate of the reference point CP through the GPS receiver 51.

A method for setting out an observation point includes the steps of: (a) selecting the observation point (a center line of a road, alignment of curbs and so on) from a controller screen; (b) allowing the observation point to approach a target point using the distance from the target point and the movement to an arrow direction indicated on the controller screen; (c) leveling the GPS measuring instrument; and (d) repeatedly moving the GPS measuring instrument to the target point in the arrow direction to determine the observation point.

However, the conventional measurement methods have the following problems.

In case of the conventional method for measuring the reference point CP through the theodolite 1000, first, the measuring pole 1100 is located at the observation point and after the circular level is leveled by using the tripod and the tongs attached to the upper portion of the tripod, the azimuth angle and distance are measured by means of the theodolite 1000 to obtain the coordinate of the reference point CP.

At this time, errors may be generated according to the distance between the ground and the prism due to the height of the measuring pole 1100, and also, artificial errors may be generated from the step where the circular level is leveled through the tongs manipulated by an auxiliary measurer.

In case of the conventional measurement for the observation point, further, after the azimuth angle of the observation point is collimated through the theodolite and the center of the measuring pole moves to left and right sides and accurately corresponds to the line of collimation, a difference value between the value of the distance observed and the value of the distance of the observation point is aligned to the observation point (a center line of a road, alignment of curbs and so on) through the forward and backward movements of the center of the measuring pole along the line of collimation. In this case, however, since the azimuth angle and distance of the observation point are fixed, the measurement is carried out through the repetition of the above-mentioned processes, thereby undesirably requiring a long period of time for measurement. Due to the errors on the height difference of the measuring pole between the ground and the prism, the errors generated according to the degree of skill of the auxiliary measurer, and the errors generated from the sensitivity of the circular level attached to the measuring pole, further, it is impossible to find an accurate observation point.

In case of the conventional method for measuring the reference point CP through the GPS receiver, a tribrach 1200 and the measuring pole 1100 are located at the observation point to obtain the coordinate of the reference point CP.

If the tribrach 1200 is used, precision becomes improved, but after the reference point CP above the ground corresponds to the center of the tribrach 1200, the tribrach 1200 should be leveled by using the legs of a tripod 1300 to minimize the movements of the reference point CP and the center of the tribrach 1200 corresponding to each other. Accordingly, the misaligned reference point CP and the center of the tribrach 1200 have to be aligned to each other by means of the unfastening of coupling screws between the tripod 1300 and the tribrach 1200, and next, the leveling steps are repeatedly carried out to align the reference point CP and the center of the tribrach 1200 through the lower screws of the tribrach 1200, thereby undesirably requiring a long period of time for measurement.

If the measuring pole to which the GPS receiver is attached is used, the measuring speed becomes improved, but after the measuring pole is located at the observation point to level the circular level attached to the measuring pole by means of the tripod for fixing the measuring pole and the tongs attached to the upper portion of the tripod, the coordinate of the reference point is produced on the controller screen. At this time, there are errors on the height difference of the measuring pole between the ground and the prism, the errors generated according to the degree of skill of the auxiliary measurer, and the errors generated according to the viewing angles of the circular level attached to the measuring pole.

In case of the conventional measurement for the observation point using the GPS measuring instrument, further, the measuring pole having an upper portion to which the GPS receiver is attached moves near the observation point and then moves to the accurate position of the observation point by using the information (distance, direction, and arrow) on the observation point (a center line of a road, alignment of curbs and so on) indicated on the controller.

Due to the errors on the height difference between the ground and the GPS receiver and the errors generated according to the degree of skill of the auxiliary measurer, however, there are limitations in the reduction of the errors caused upon the measurement of the observation point through the existing measuring equipment (theodolite, GPS measuring instrument, prism, measuring pole and so on).

DISCLOSURE

Technical Problem

Accordingly, the present invention has been made in view of the above-mentioned problems occurring in the prior art, and it is an object of the present invention to provide an improved portable prism receiver, an improved portable GPS receiver and a measurement method using the same that are adapted to rapidly measure accurate locations in building construction and civil construction sites, while being simple in structure and volume to enable convenient transportation and storage, and that allow even an unskilled worker to conduct mechanically accurate measurements in a construction site to improve the quality and economic efficiency thereof.

Technical Solution

To accomplish the above-mentioned object, according to the present invention, there is provided an improved portable prism receiver including: a receiving part 62 for receiving a signal from a theodolite 1000; a level 61 attached to the receiving part 62; a support rod 63 attached to the underside of the receiving part 62 in such a manner as to be tapered on the front end thereof and having a protruding bar 64 exposed from the outer peripheral surface thereof; a support rod fixing stand 68 having a through hole formed thereon to pass the support rod 63 therethrough and a slot 69 formed thereon to move the protruding bar 64 upwardly and downwardly; a base plate 67 attached to the underside of the support rod fixing stand 68; and a plurality of position adjusters 65 disposed on the corners of the base plate 67 in such a manner as to be adjustable in position upwardly and downwardly, wherein in the state where the front end of the support rod 63 comes into contact with a reference point CP, the signal from the theodolite 1000 is received to the receiving part 62, and in the state where leveling is maintained by means of the level 61, next, position adjustment is carried out by means of the position adjusters 65.

Advantageous Effects

According to the present invention, the improved portable prism receiver, the improved portable GPS receiver and the measurement method using the same are adapted to rapidly measure accurate locations in building construction and civil construction sites, while being simple in structure and volume to enable convenient transportation and storage, and allow even an unskilled worker to conduct mechanically accurate measurements in a construction site to improve the quality and economic efficiency thereof.

DESCRIPTION OF DRAWINGS

The file of this patent contains at least one drawing executed in color. Copies of this patent with color drawing(s) will be provided by the Office upon request and payment of the necessary fee.

FIGS. 1 and 2 are photographs showing measurement methods using conventional theodolite and measuring pole.

FIG. 3 is photographs showing a measurement method using a conventional GPS measuring instrument.

FIG. 15 is a view showing the results obtained by the measurement method using the improved portable prism receiver according to the present invention.

FIGS. 20 and 21 show controller screens used in the measurement method using the improved portable GPS receiver according to the present invention.

BEST MODE FOR INVENTION

Figure 4:
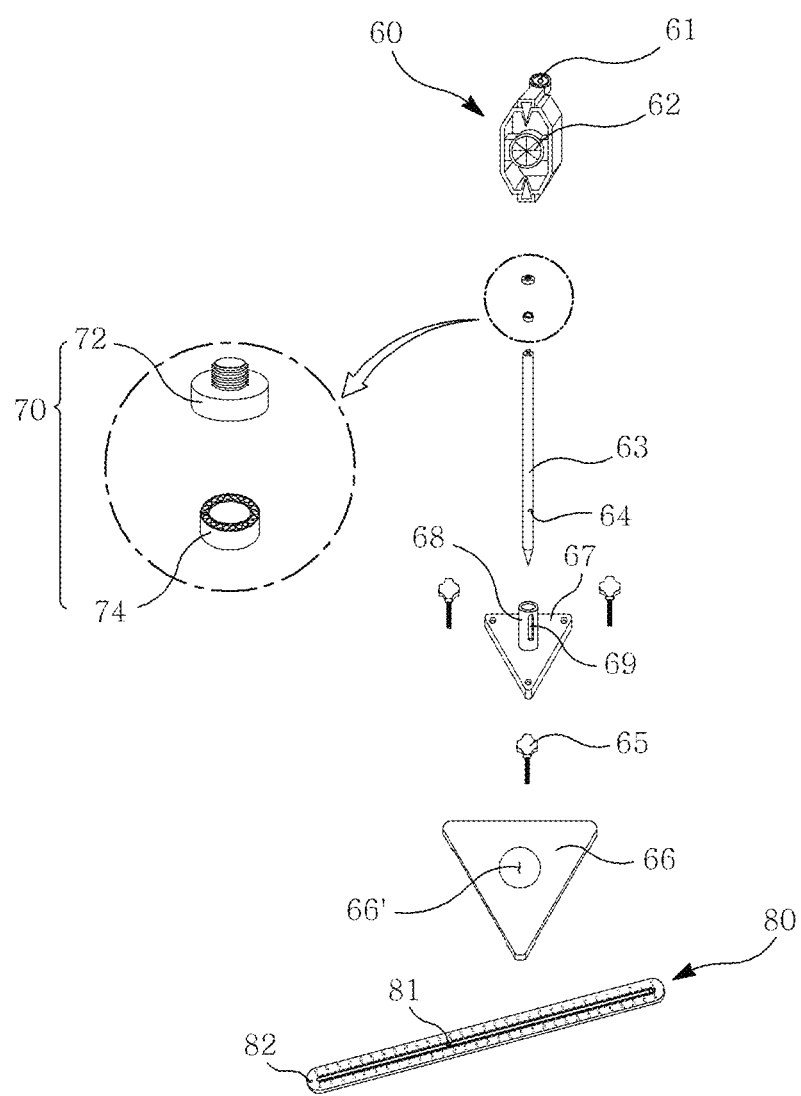
FIG. 4 is an exploded perspective view showing an improved portable prism receiver according to the present invention.

An improved portable prism receiver 60 according to the present invention includes: a receiving part 62 for receiving a signal from a theodolite 1000; a level 61 attached to the receiving part 62; a support rod 63 attached to the underside of the receiving part 62 in such a manner as to be tapered on the front end thereof and having a protruding bar 64 exposed from the outer peripheral surface thereof; a support rod fixing stand 68 having a through hole formed thereon to pass the support rod 63 therethrough and a slot 69 formed thereon to move the protruding bar 64 upwardly and downwardly; a base plate 67 attached to the underside of the support rod fixing stand 68; and a plurality of position adjusters 65 disposed on the corners of the base plate 67 in such a manner as to be adjustable in position upwardly and downwardly, wherein in the state where the front end of the support rod 63 comes into contact with a reference point CP, the signal from the theodolite 1000 is received to the receiving part 62, and in the state where leveling is maintained by means of the level 61, next, position adjustment is carried out by means of the position adjusters 65.

MODE FOR INVENTION

Hereinafter, an explanation on the present invention will be given with reference to the attached drawings.

1. Improved Portable Prism Receiver

Figure 5:
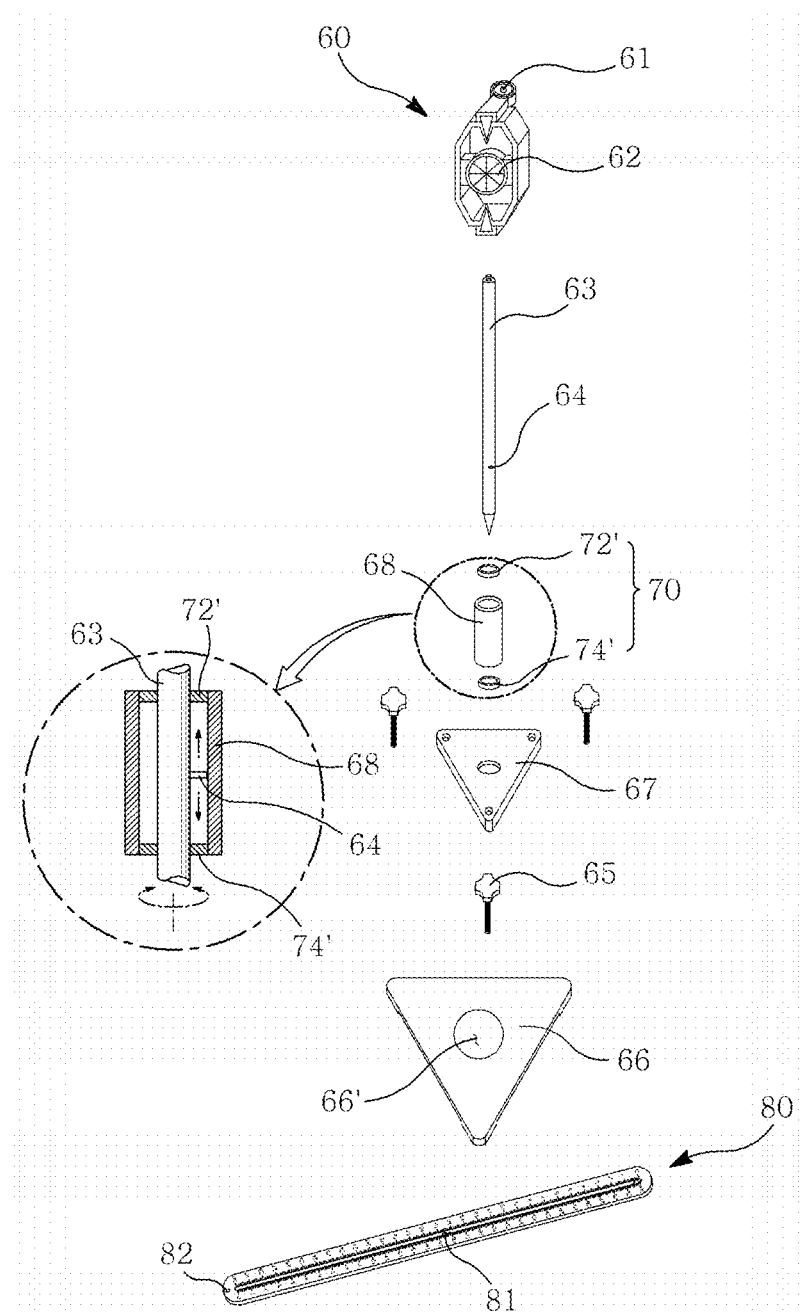
FIG. 5 is an exploded perspective view showing another embodiment of the improved portable prism receiver according to the present invention.
Figure 6:
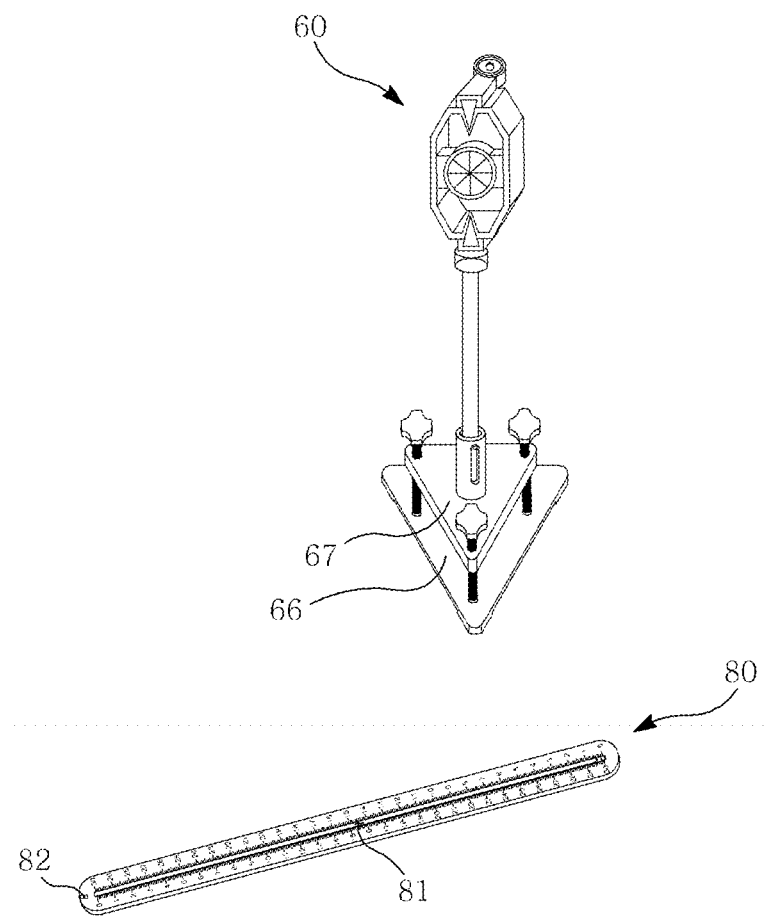
FIG. 6 is a perspective view showing the coupled state in FIG. 4.

FIG. 4 is an exploded perspective view showing an improved portable prism receiver according to the present invention, FIG. 5 is an exploded perspective view showing another embodiment of the improved portable prism receiver according to the present invention, and FIG. 6 is a perspective view showing the coupled state in FIG. 4.

The improved portable prism receiver 60 according to the present invention includes: the receiving part 62 for receiving a signal from the theodolite 1000; the level 61 attached to the receiving part 62; the support rod 63 attached to the underside of the receiving part 62 in such a manner as to be tapered on the front end thereof and having the protruding bar 64 exposed from the outer peripheral surface thereof; the support rod fixing stand 68 having a through hole formed thereon to pass the support rod 63 therethrough and the slot 69 formed thereon to move the protruding bar 64 upwardly and downwardly; the base plate 67 attached to the underside of the support rod fixing stand 68; and the plurality of position adjusters 65 disposed on the corners of the base plate 67 in such a manner as to be adjustable in position upwardly and downwardly, wherein in the state where the front end of the support rod 63 comes into contact with the reference point CP, the signal from the theodolite 1000 is received to the receiving part 62, and in the state where leveling is maintained by means of the level 61, next, position adjustment is carried out by means of the position adjusters 65.

Further, as shown in FIG. 4, the improved portable prism receiver 60 according to the present invention further includes: rotation means 70 disposed between the receiving part 62 and the support rod 63 to rotate the receiving part 62.

The rotation means 70 includes a bearing 74 and a receiving part mounting base 72, but it may be formed of typical means.

Furthermore, as shown in FIG. 5, the rotation means 70 includes an upper projection member 72' and a lower projection member 74' disposed on top and underside of the support rod fixing stand 68 where no slot 69 is formed, so that the support rod 63 is rotatable inside the support rod fixing stand 68 and the protruding bar 64 is movable upwardly and downwardly within the range where the protruding bar 64 is locked onto the upper projection member 72' and the lower projection member 74'.

Figure 7:
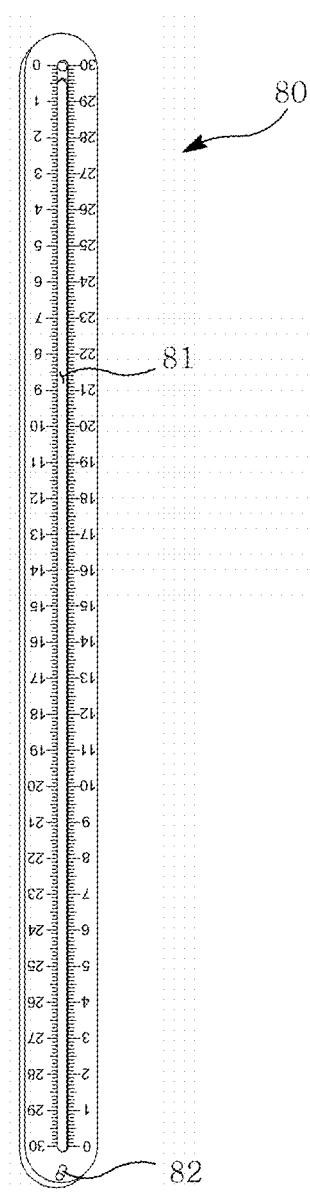
FIG. 7 is a perspective view showing a measuring ruler used in the present invention.

FIG. 7 is a perspective view showing a measuring ruler used in the present invention.

As shown in FIGS. 4 to 7, the improved portable prism receiver 60 according to the present invention further includes a measuring ruler 80 having scales indicated on the surface thereof, a slot 81 formed therealong to move the front end of the support rod 63, and a measuring bar 82 disposed vertically therefrom, so that the measuring bar 82 rotates toward the theodolite 1000 to align the measuring ruler 80 to a line of collimation VL, and the front end of the support rod 63 moves along the slot 81 of the measuring ruler 80 to an accurate measurement location.

The improved portable prism receiver 60 according to the present invention further includes a support plate 66 having a through hole 66' formed thereon to pass the front end of the support rod 63, so that at the location where an irregular portion is formed on the ground, the undersides of the position adjusters 65 do not just come into contact with the ground, but come into contact with top of the support plate 66, thereby easily performing the position adjustment.

2. Improved Portable GPS Receiver

Figure 8:
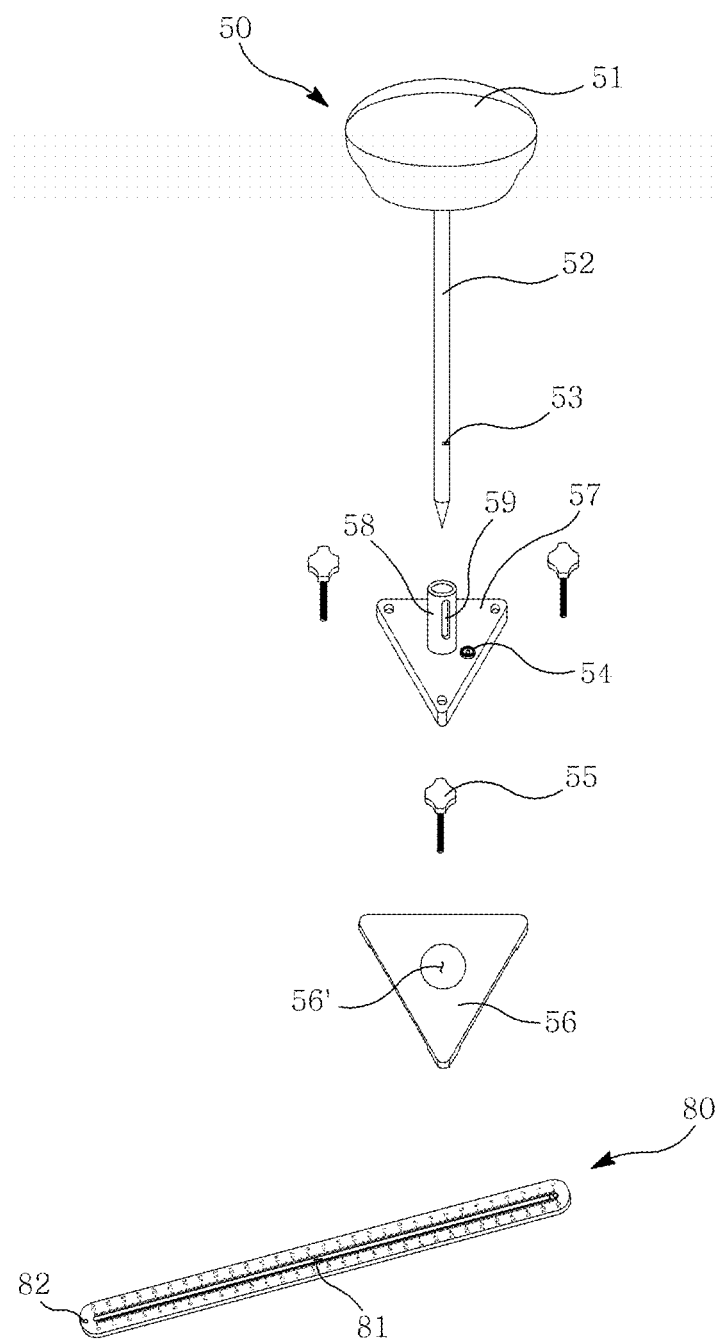
FIG. 8 is an exploded perspective view showing an improved portable GPS receiver according to the present invention.
Figure 9:
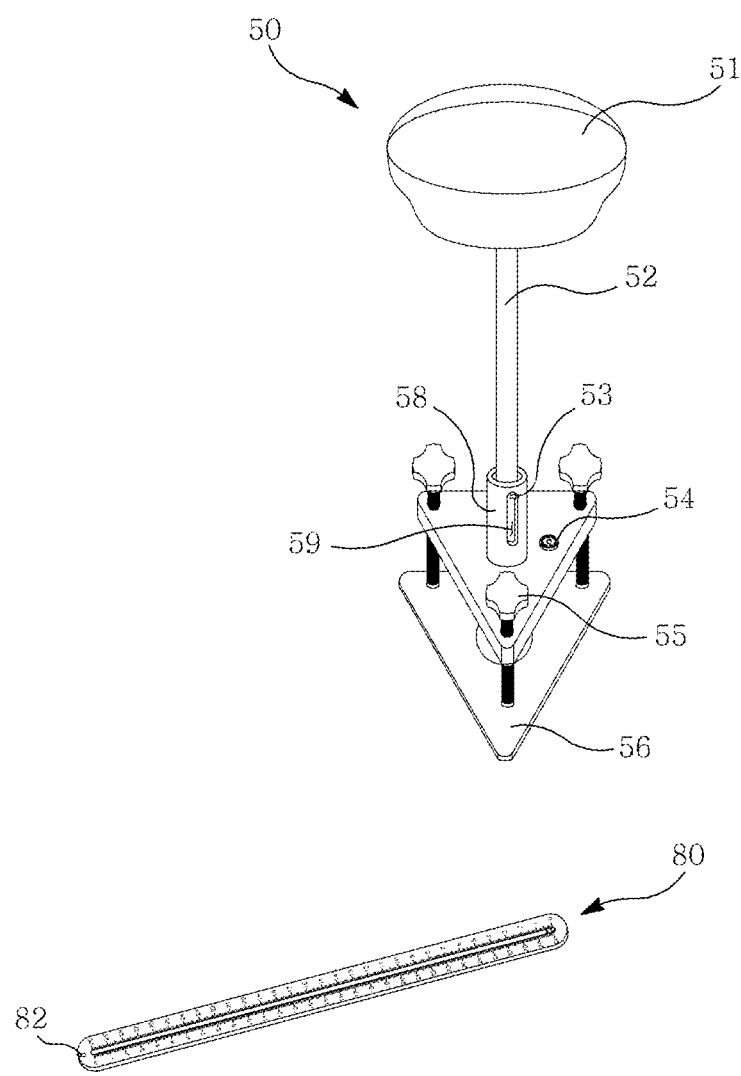
FIG. 9 is a perspective view showing the coupled state in FIG. 8.
Figure 10:
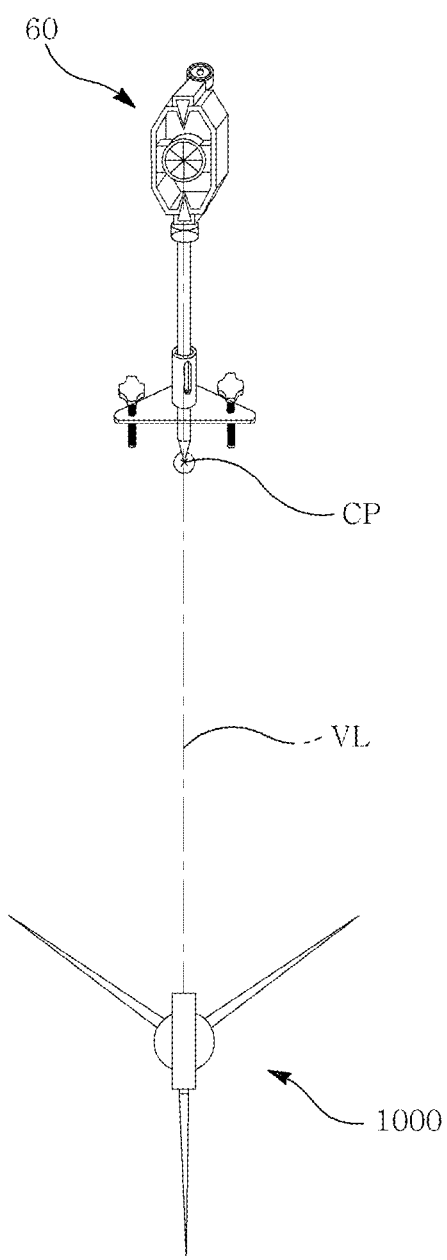
FIGS. 10 to 14 are views showing a measurement method using the improved portable prism receiver according to the present invention.
Figure 11:
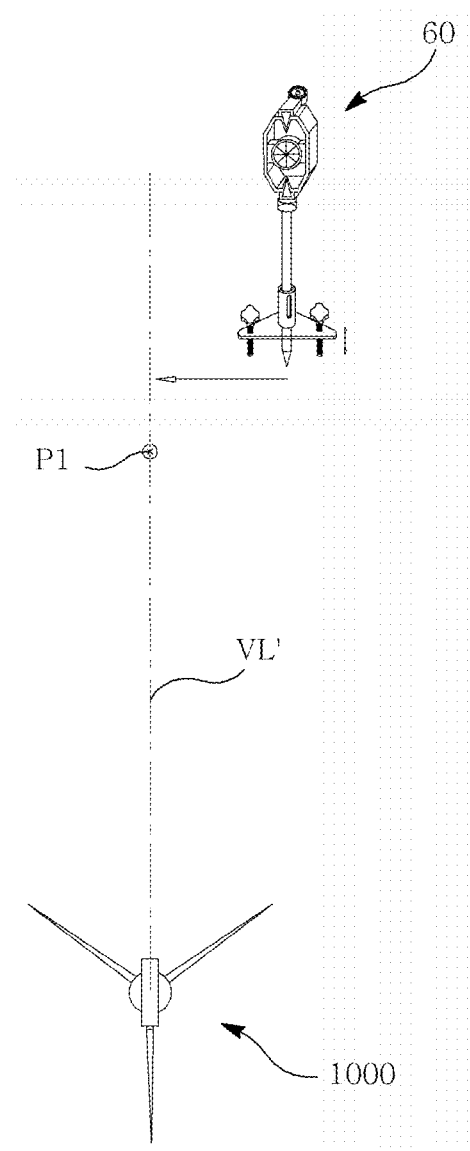
Figure 12:
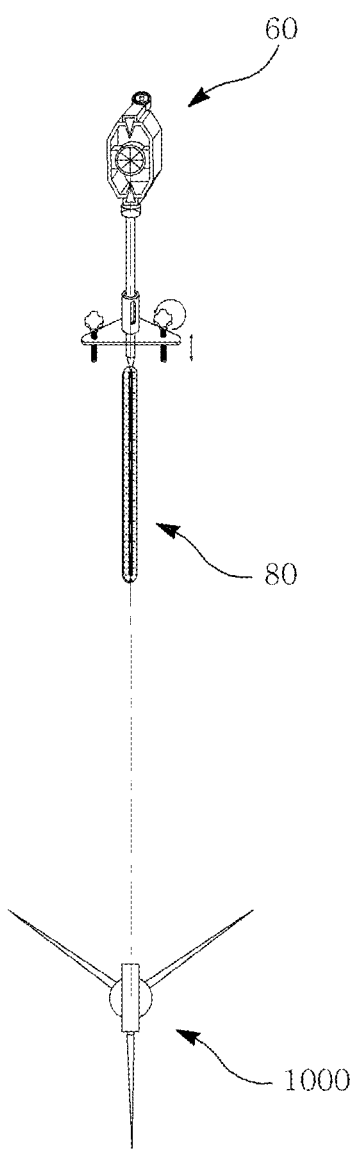
Figure 13:
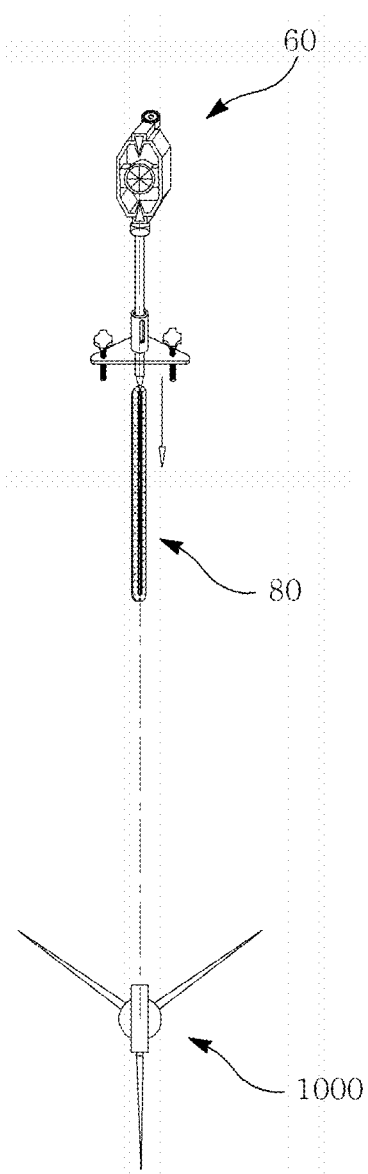
Figure 14:
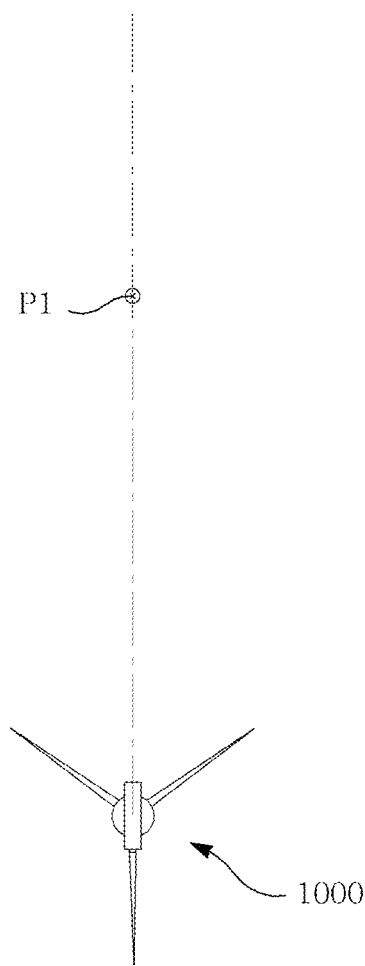

FIG. 8 is an exploded perspective view showing an improved portable GPS receiver according to the present invention, and FIG. 9 is a perspective view showing the coupled state in FIG. 8.

An improved portable GPS receiver 50 according to the present invention includes: a GPS receiving part 51 for receiving a signal from a satellite (not shown); a support rod 52 attached to the underside of the GPS receiving part 51 in such a manner as to be tapered on the front end thereof and having a protruding bar 53 exposed from the outer peripheral surface thereof; a support rod fixing stand 58 having a through hole formed thereon to pass the support rod 52 therethrough and a slot 59 formed thereon to move the protruding bar 53 upwardly and downwardly; a base plate 57 attached to the underside of the support rod fixing stand 58 and a level 54 disposed on top thereof; and a plurality of position adjusters 55 disposed on the corners of the base plate 57 in such a manner as to be adjustable in position upwardly and downwardly, wherein in the state where the front end of the support rod 52 comes into contact with a reference point CP, the signal from the satellite is received to the GPS receiving part 51, and in the state where leveling is maintained by means of the level 54, next, position adjustment is carried out by means of the position adjusters 55.

Further, the improved portable GPS receiver 50 according to the present invention further includes a measuring ruler 80 having scales indicated on the surface thereof, a slot 81 formed therealong to move the front end of the support rod 52, and a measuring bar 82 disposed vertically therefrom, so that the measuring bar 82 rotates toward the satellite to align the measuring ruler 80 to a line of collimation VL, and the front end of the support rod 52 moves along the slot 81 of the measuring ruler 80 to an accurate measurement location.

Further, the improved portable GPS receiver 50 according to the present invention includes a support plate 56 having a through hole 56' formed thereon to pass the front end of the support rod 52 therethrough, so that at the location where an irregular portion is formed on the ground, the undersides of the position adjusters 55 do not just come into contact with the ground, but come into contact with top of the support plate 56, thereby easily performing the position adjustment.

3. Measurement Method Using Improved Portable Prism Receiver

FIGS. 10 to 14 are views showing a measurement method using the improved portable prism receiver according to the present invention, and FIG. 15 is a view showing the results obtained by the measurement method using the improved portable prism receiver according to the present invention.

A measurement method using the improved portable prism receiver 60 according to the present invention includes the steps of: (a) positioning the front end of the support rod 63 of the improved portable prism receiver 60 at the reference point CP; (b) performing position adjustment through the position adjusters 65 in the state where leveling is maintained by means of the level 61; (c) acquiring the coordinate of the improved portable prism receiver 60 through the theodolite 1000; (d) newly collimating the theodolite 1000 to an azimuth angle to be measured to set an observation line of collimation VL' at which an observation point P1 is located; (e) positioning the front end of the support rod 63 of the improved portable prism receiver 60 at the observation line of collimation VL'; (f) performing position adjustment through the position adjusters 65 in the state where leveling is maintained by means of the level 61; (g) acquiring the distance of the improved portable prism receiver 60 through the theodolite 1000; (h) obtaining a difference between the acquired distance of the improved portable prism receiver 60 and the distance of the observation point P1 and allowing the improved portable prism receiver 60 to approach the observation point P1 at the observation line of collimation VL' within a given error range in accordance with the distance difference; (i) acquiring the distance of the improved portable prism receiver 60 through the theodolite 1000; (j) obtaining the distance of the improved portable prism receiver 60 through the theodolite 1000, obtaining a difference between the obtained distance of the improved portable prism receiver 60 and the distance of the observation point P1, and allowing the improved portable prism receiver 60 to approach the accurate position of the observation point P1 at the observation line of collimation VL' in accordance with the distance difference; and (k) indicating the observation point P1 on the ground, wherein at the step (j), the measuring bar 82 rotates toward the theodolite 1000 to align the measuring ruler 80 to the line of collimation VL, and the front end of the support rod 63 moves along the slot 81 of the measuring ruler 80 by the difference between the obtained distance of the improved portable prism receiver 60 and the distance of the observation point P1.

At the step (i), the error range is about +15 cm.

At the step (j), when the measuring bar 82 rotates toward the theodolite 1000 to align the measuring ruler 80 to the line of collimation VL and the front end of the support rod 63 moves along the slot 81 of the measuring ruler 80 by the difference between the obtained distance of the improved portable prism receiver 60 and the distance of the observation point P1, the front end of the support rod 63 is positioned at a value around a zero point of a 30 cm ruler and then located at the zero point of the 30 cm ruler to move from the zero point of the 30 cm ruler.

The results obtained by the repetition of above-mentioned processes are shown in FIG. 15.

4. Measurement Method Using Improved Portable GPS Receiver

Figure 16:
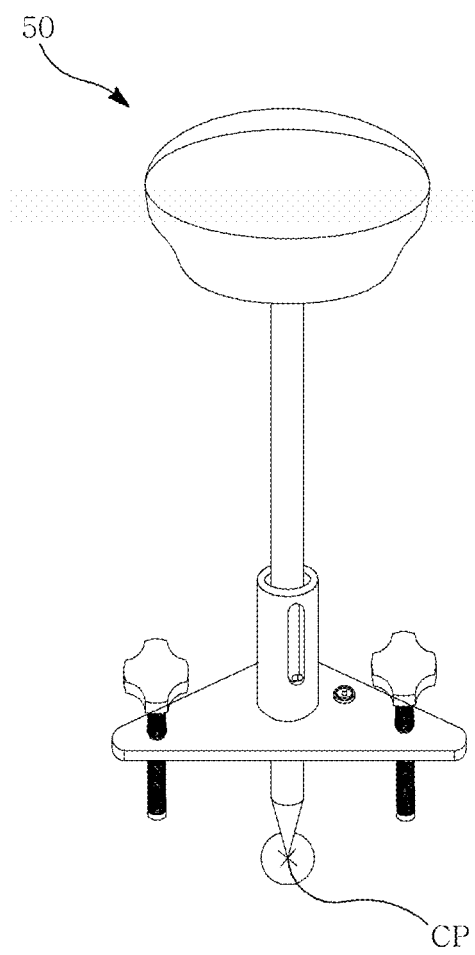
FIGS. 16 to 18 are views showing a measurement method using the improved portable GPS receiver according to the present invention.
Figure 17:
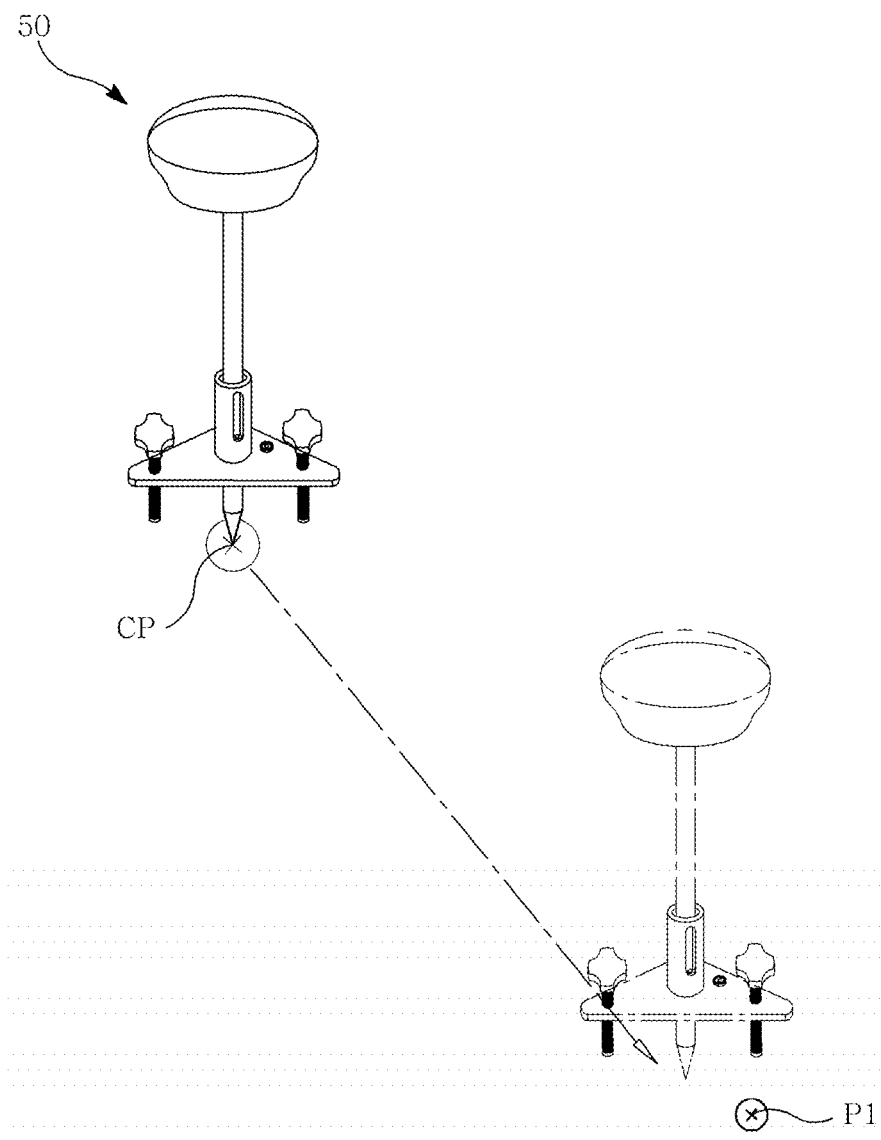
Figure 18:
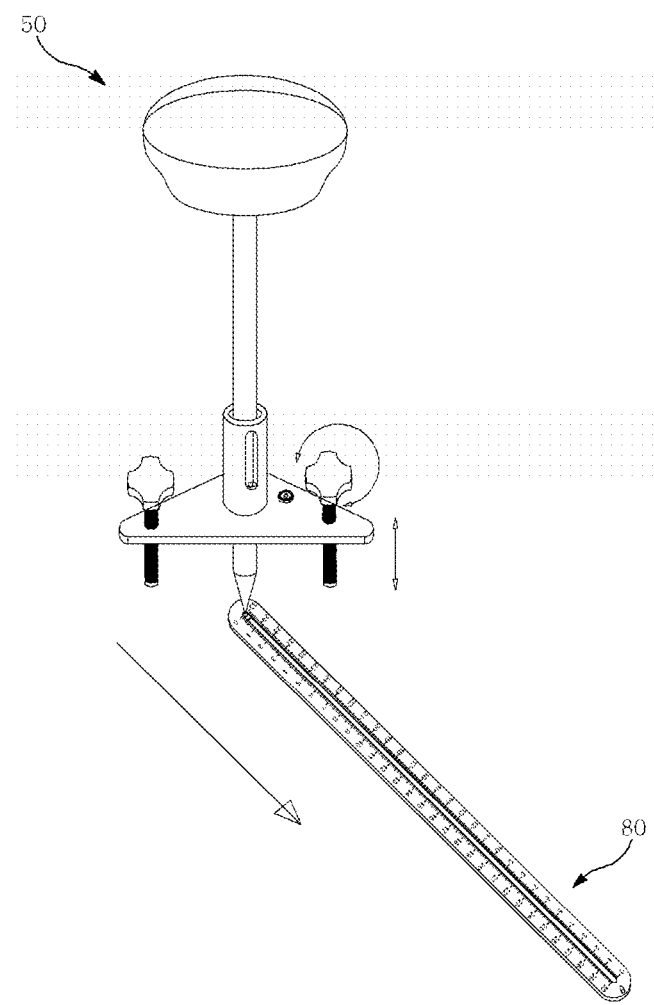
Figure 19:
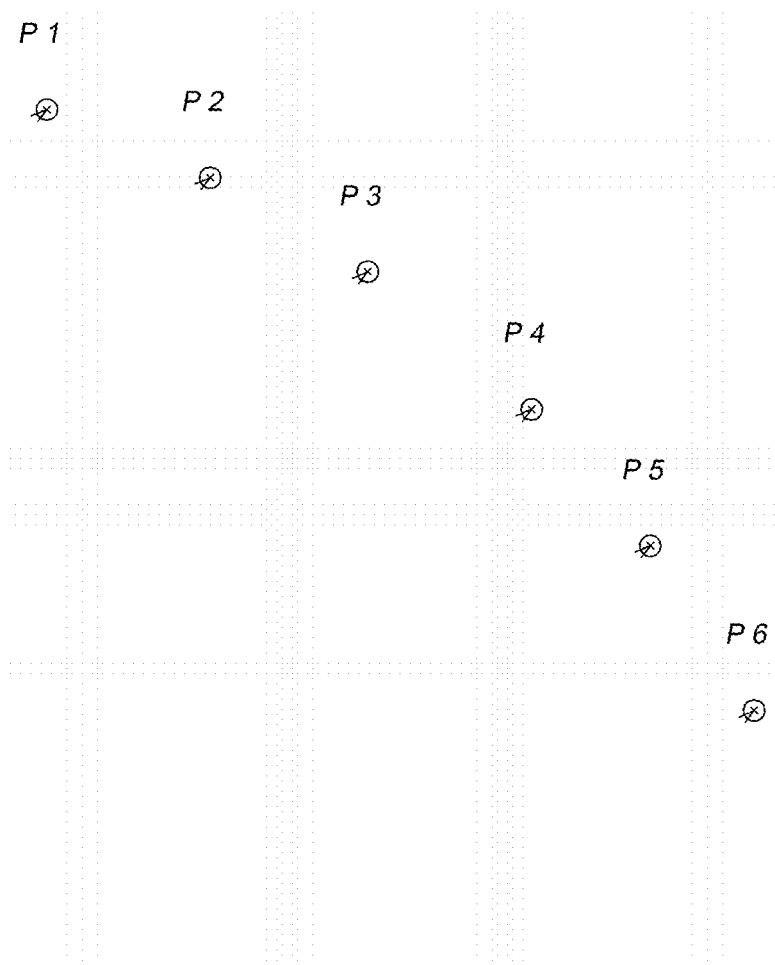
FIG. 19 is a view showing the results obtained by the measurement method using the improved portable GPS receiver according to the present invention.

FIGS. 16 to 18 are views showing a measurement method using the improved portable GPS receiver according to the present invention, FIG. 19 is a view showing the results obtained by the measurement method using the improved portable GPS receiver according to the present invention, and FIGS. 20 and 21 are controller screens used in the measurement method using the improved portable GPS receiver according to the present invention.

A measurement method using the improved portable GPS receiver 50 according to the present invention includes the steps of: (a) positioning the front end of the support rod 52 of the improved portable GPS receiver 50 at the reference point CP; (b) performing position adjustment through the position adjusters 55 in the state where leveling is maintained by means of the level 54; (c) acquiring the coordinate of the improved portable GPS receiver 50 through a controller; (d) allowing the improved portable GPS receiver 50 to approach a new observation point P1 displayed by the controller within a given error range; (e) rotating the measuring bar 82 in a direction of an arrow displayed by the controller; and (f) indicating the accurate observation point P1 displayed by the controller through the slot 81 of the measuring ruler 80 on the ground.

At the step (d), the error range is about +15 cm.

The results obtained by the repetition of above-mentioned processes are shown in FIG. 19.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings.

It is therefore intended that the scope of the invention be limited not by this detailed description, but rather by the claims appended hereto.

INDUSTRIAL APPLICABILITY

The present invention relates to the improved portable prism receiver, the improved portable GPS receiver and the measurement method using the same that are adapted to rapidly measure accurate locations in building construction and civil construction sites, while being simple in structure and volume to enable convenient transportation and storage, and allow even an unskilled worker to conduct mechanically accurate measurements in a construction site to improve the quality and economic efficiency thereof.

The invention claimed is:

1. An improved portable prism receiver comprising:
  a receiving part for receiving a signal from a theodolite;
  a level attached to the receiving part;
  a support rod attached to the underside of the receiving part in such a manner as to be tapered on the front end thereof and having a protruding bar exposed from the outer peripheral surface thereof;
  a support rod fixing stand having a through hole formed thereon to pass the support rod therethrough and a slot formed thereon to move the protruding bar upwardly and downwardly;
  a base plate attached to the underside of the support rod fixing stand; and
  a plurality of position adjusters disposed on the corners of the base plate in such a manner as to be adjustable in position upwardly and downwardly,
  wherein in the state where the front end of the support rod comes into contact with a reference point CP, the signal from the theodolite is received to the receiving part, and in the state where leveling is maintained by means of the level, next, position adjustment is carried out by means of the position adjusters.

2. The improved portable prism receiver according to claim 1, further comprising rotation means disposed between the receiving part and the support rod to rotate the receiving part.

3. The improved portable prism receiver according to claim 2, wherein the rotation means comprises an upper projection member and a lower projection member disposed on top and underside of the support rod fixing stand where no slot is formed, so that the support rod is rotatable inside the support rod fixing stand and the protruding bar is movable upwardly and downwardly within the range where the protruding bar is locked onto the upper projection member and the lower projection member.

4. The improved portable prism receiver according to claim 2, further comprising a measuring ruler having scales indicated on the surface thereof, a slot formed therealong to move the front end of the support rod, and a measuring bar disposed vertically therefrom, so that the measuring bar rotates toward the theodolite to align the measuring ruler to a line of collimation VL', and the front end of the support rod moves along the slot to an accurate measurement location.

5. The improved portable prism receiver according to claim 2, further comprising a support plate having a through hole formed thereon to pass the front end of the support rod therethrough, so that at the location where an irregular portion is formed on the ground, the undersides of the position adjusters do not just come into contact with the surface of ground, but come into contact with top of the support plate, thereby easily performing the position adjustment.

6. The improved portable prism receiver according to claim 1, further comprising a measuring ruler having scales indicated on the surface thereof, a slot formed therealong to move the front end of the support rod, and a measuring bar disposed vertically therefrom, so that the measuring bar rotates toward the theodolite to align the measuring ruler to a line of collimation VL', and the front end of the support rod moves along the slot to an accurate measurement location.

7. A measurement method using the improved portable prism receiver according to claim 6, the measurement method comprising the steps of:
(a) positioning the front end of the support rod of the improved portable prism receiver at the reference point CP;
(b) performing position adjustment through the position adjusters in the state where leveling is maintained by means of the level;
(c) acquiring the coordinate of the improved portable prism receiver through the theodolite;
(d) newly collimating the theodolite to an azimuth angle to be measured to set an observation line of collimation VL' at which an observation point P1 is located;
(e) positioning the front end of the support rod of the improved portable prism receiver at the observation line of collimation VL';
(f) performing position adjustment through the position adjusters in the state where leveling is maintained by means of the level;
(g) acquiring the distance of the improved portable prism receiver through the theodolite;
(h) obtaining a difference between the acquired distance of the improved portable prism receiver and the distance of the observation point P1 and allowing the improved portable prism receiver to approach the observation point P1 at the observation line of collimation VL' within a given error range in accordance with the distance difference;
(i) acquiring the distance of the improved portable prism receiver through the theodolite;
(j) obtaining the distance of the improved portable prism receiver through the theodolite, obtaining a difference between the obtained distance of the improved portable prism receiver and the distance of the observation point P1, and allowing the improved portable prism receiver to approach the accurate position of the observation point P1 at the observation line of collimation VL' in accordance with the distance difference; and
(k) indicating the observation point P1 on the ground, wherein at the step (j), the measuring bar rotates toward the theodolite to align the measuring ruler to the line of collimation VL', and the front end of the support rod moves along the slot of the measuring ruler by the difference between the obtained distance of the improved portable prism receiver and the distance of the observation point P1.

8. The improved portable prism receiver according to claim 1, further comprising a support plate having a through hole formed thereon to pass the front end of the support rod therethrough, so that at the location where an irregular portion is formed on the ground, the undersides of the position adjusters do not just come into contact with the surface of ground, but come into contact with top of the support plate, thereby easily performing the position adjustment.

9. An improved portable GPS receiver comprising:
a GPS receiving part for receiving a signal from a satellite (not shown);
a support rod attached to the underside of the GPS receiving part in such a manner as to be tapered on the front end thereof and having a protruding bar exposed from the outer peripheral surface thereof;
a support rod fixing stand having a through hole formed thereon to pass the support rod therethrough and a slot formed thereon to move the protruding bar upwardly and downwardly;
a base plate attached to the underside of the support rod fixing stand and a level disposed on top thereof; and
a plurality of position adjusters disposed on the corners of the base plate in such a manner as to be adjustable in position upwardly and downwardly,
wherein in the state where the front end of the support rod comes into contact with a reference point CP, the signal from the satellite is received to the GPS receiving part, and in the state where leveling is maintained by means of the level, next, position adjustment is carried out by means of the position adjusters.

10. The improved portable GPS receiver according to claim 9, further comprising a measuring ruler having scales indicated on the surface thereof, a slot formed therealong to move the front end of the support rod, and a measuring bar disposed vertically therefrom, so that the measuring bar rotates toward the satellite to align the measuring ruler to a line of collimation VL, and the front end of the support rod moves along the slot to an accurate measurement location.

11. A measurement method using the improved portable GPS receiver according to claim 10, the measurement method comprising the steps of:
(a) positioning the front end of the support rod of the improved portable GPS receiver at the reference point CP;
(b) performing position adjustment through the position adjusters in the state where leveling is maintained by means of the level;
(c) acquiring the coordinate of the improved portable GPS receiver through a controller;
(d) allowing the improved portable GPS receiver to approach a new observation point P1 displayed by the controller within a given error range;
(e) rotating the measuring bar in a direction of an arrow displayed by the controller; and
(f) indicating the accurate observation point P1 displayed by the controller on the slot of the measuring ruler on the ground.

12. The improved portable GPS receiver according to claim 10, further comprising a support plate having a through hole formed thereon to pass the front end of the support rod therethrough, so that at the location where an irregular portion is formed on the ground, the undersides of the position adjusters do not just come into contact with the surface of ground, but come into contact with top of the support plate, thereby easily performing the position adjustment.

13. The improved portable GPS receiver according to claim 9, further comprising a support plate having a through hole formed thereon to pass the front end of the support rod therethrough, so that at the location where an irregular portion is formed on the ground, the undersides of the position adjusters do not just come into contact with the surface of ground, but come into contact with top of the support plate, thereby easily performing the position adjustment.

\* \* \* \* \*